Inventor
IAN GOODHALL MEIKLEJOHN

Oct. 7, 1969   I. G. MEIKLEJOHN   3,471,162
HAND-PROPELLED WHEELED CARRIERS
Filed Oct. 25, 1967   3 Sheets-Sheet 2
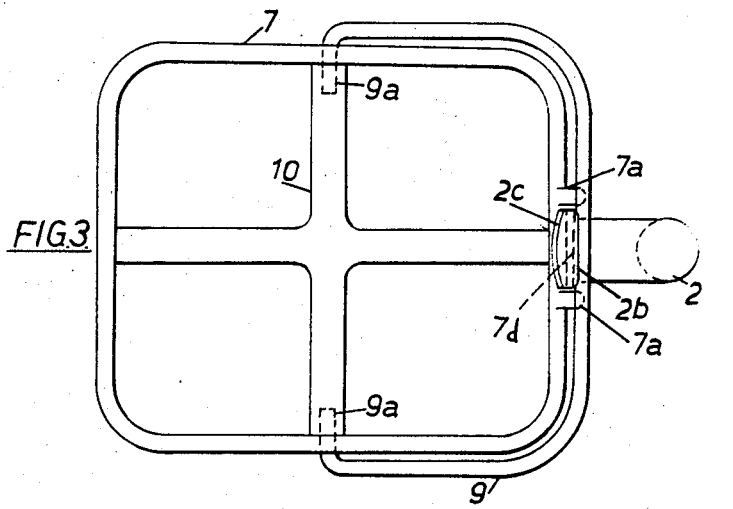
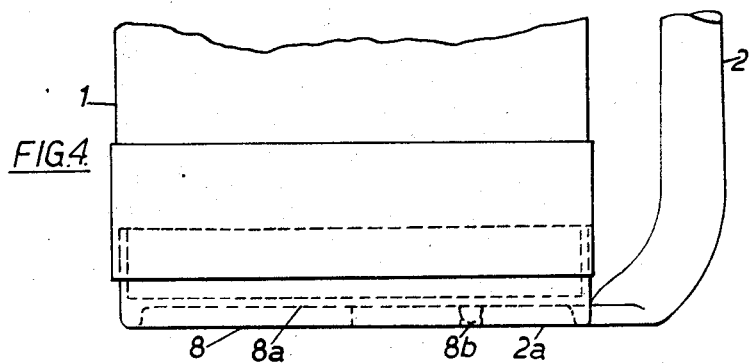
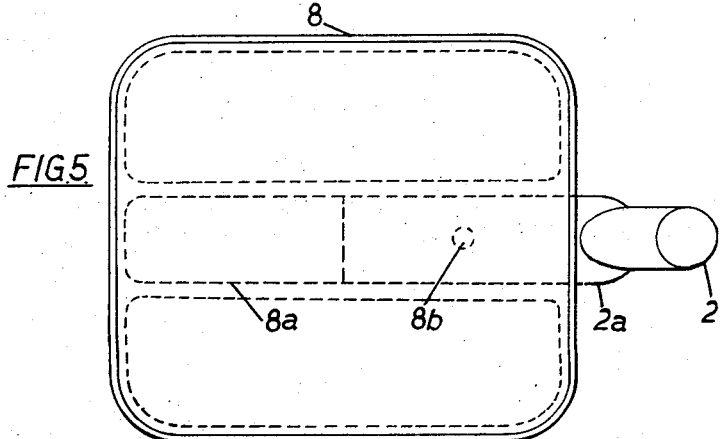
Inventor
IAN GOODHALL MEIKLEJOHN
By Mason, Fenwick & Lawrence
Attorneys Oct. 7, 1969  I. G. MEIKLEJOHN  3,471,162
HAND-PROPELLED WHEELED CARRIERS Filed Oct. 25, 1967  3 Sheets-Sheet 3

Inventor

IAN GOODHALL MEIKLEJOHN

United States Patent Office 3,471,162
Patented Oct. 7, 1969

3,471,162
HAND-PROPELLED WHEELED CARRIERS
Ian G. Meiklejohn, Fife, Scotland, assignor to
I. G. Meiklejohn & Company Limited
Filed Oct. 25, 1967, Ser. No. 677,896
Claims priority, application Great Britain, Oct. 28, 1966, 48,491/66
Int. Cl. B62b 1/20, 9/26
U.S. Cl. 280—47.26
10 Claims

ABSTRACT OF THE DISCLOSURE

This invention relates to a hand-propelled wheeled carrier of the kind comprising a wheeled frame and a container detachably mounted thereon. The container is secured to the frame at its top by a releasable clamp and at its bottom by a complementary projection and recess.

---

One example of a wheeled carrier of the kind aforesaid is a golf trolley in which the frame is an upwardly extending stem and the container is a golf bag which rests on top and bottom cradles on the stem and is detachably secured to the cradles by buckled straps or alternatively by rubber shock cords. With this arrangement, the mounting and detachment of the bag is relatively slow and difficult. Further, as a wide variety of shapes and sizes of golf bags is in use, the matching of a bag with a frame is often not completely satisfactory either in the trundling position or, in the case of folding trolleys, in the folded position. Also, as the usual means for attaching the bag to the frame are straps or elastic shock cords, relative movement between the bag and frame often occurs, resulting in wear of both the bag and the attachment means.

An object of the invention is to provide a wheeled carrier of the kind aforesaid embodying a simple arrangement whereby the container is quickly and easily mounted on and detached from the wheeled frame.

A further object of the invention is to provide a wheeled frame and a detachable container which co-operate to form a composite unit.

A still further object of the invention is to provide a method for the attachment of the wheeled frame to the container, which method prevents movement of the frame relative to the container and thus minimize wear of the container.

Embodiments of the invention will now be described by way of example with reference to the accompanying drawings in which:

FIG. 3 is a plan view corresponding to FIG. 2;

FIG. 4 is a side view of a further detail of the carrier shown in FIG. 1, also to a larger scale;

FIG. 5 is a plan view corresponding to FIG. 4; and

Figure 1:
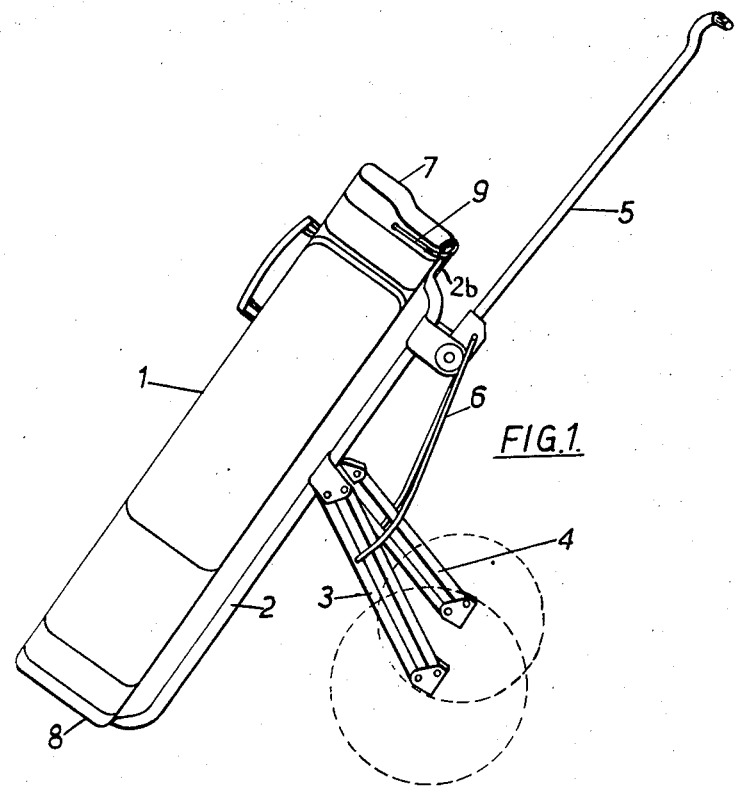
FIG. 1 is a side view of wheeled carrier of the kind aforesaid for use in carrying golf clubs.

Referring to the drawings, a wheeled carrier of the kind aforesaid consists generally of a container in the form of a golf bag 1, and a wheeled frame in the form of a stem 2 on which a pair of wheeled leg structures 3 and 4 are pivotally mounted. A pivotal handle 5 is carried by the stem, and an inverted wish-bone-shaped, resiliently deformable strut 6 of spring steel wire is pivotally connected at the base of the wishbone to the handle 5 and at the extremities of the wishbone limbs to the respective leg structures 3 and 4. Pivoting of the handle 5 causes movement of the leg structures 3 and 4 between a collapsed position alongside the stem 2, and an extended position (FIG. 1) in which the wheels form with the bottom portion of the stem 2 a stable three point ground support for the carrier when the latter is stationary.

The bottom portion of the stem 2 is flattened at 2a and projects rearwards at right angles to the stem 2 to form a lateral support platform for the bag. The upper portion of the stem 2 is offset rearwardly and terminates in an upright flattened tongue 2b serving as a post against which the top of the bag 1 abuts. A rearwardly projecting lug 2c on the post merges in a curve with the post top and constitutes a cam formation for the purpose hereinafter described. This lug overhangs the rim of the bag and co-operates with the bag to locate the bag.

The bag 1 includes a framework composed of a top ring 7, a base 8, and a peripheral series of upright spring steel rods (not shown) connecting the ring 7 and base 8. The base 8 has in its bottom face an open-ended groove 8a which accommodates the lateral support platform 2a, the latter forming a locating tongue and lying flush with said bottom face so that when the base 8 is located on the platform 2a and the wheels are collapsed the frame and the bag thereon are free standing. A pin and hole connection 8b between the base 8 and the platform 2a constitutes a complementary projection and recess means and prevents lateral withdrawal from the platform. The top ring 7 of the bag has projecting forwardly from a flat front face thereof a pair of parallel flanges or lugs 7a defining with said flat face a guide socket in which the flat tongue 2b engages; the opposed flat faces of ring and tongue engage each other and the bag top is located against lateral movement. The bag is releasably fastened in the correct position on the frame by a clamp including a U-loop 9 of round-section, resiliently deformable material, for example round-section spring steel, pivotally mounted on the top ring 7 to co-operate with the post 2b in securing the upper portion of the bag 1 to the upper portion of the stem 2. The U-limbs have inturned ends 9a extending through diametrically opposed openings in the top ring 7 and project into openings in the ends of opposed spider arms of a club divider 10 in the top ring 7 to support the divider in the ring. The loop 9 is shaped and dimensioned so that on free outward pivoting thereof the U-base first engages the top of the lug 2c, and is finally forced round the curved face which by its cam action resiliently elongates the loop, that is, alters its configuration. The loop 9 on passing on to the tongue 2b is maintained by the tongue in the elongated state so that the opposed flat faces of ring and tongue are forced tightly together to resist movement of the bag relative to the support. Thus, the bag is firmly clamped to the frame and the loop frictionally grips the tongue 2b. A shallow groove 7d (FIG. 3) on the tongue 2b at its point of contact with the base of the loop 9 aids in the positive location of the loop. The lugs 7a are engaged by the loop base to limit the downward pivoting movement of the loop 9. Moreover, a pair of cams 7e notched at 7b extend upwards from the lugs 7a and are engageable by the loop 9 when the bag 1 has been detached from the frame, so that the loop elongates resiliently and snaps into the notches 7b. The loop 9 on the detached bag 1 is thus locked against free pivoting movement.

The top ring 7, the base 8, and the divider 10 are all moulded of suitable synthetic resinous material. Alternatively the ring and base at the top and bottom of the bag are metal pressing or castings rivetted to the framework of a conventional bag, the framework being of steel and being covered with leather or fabric.

Figure 2:
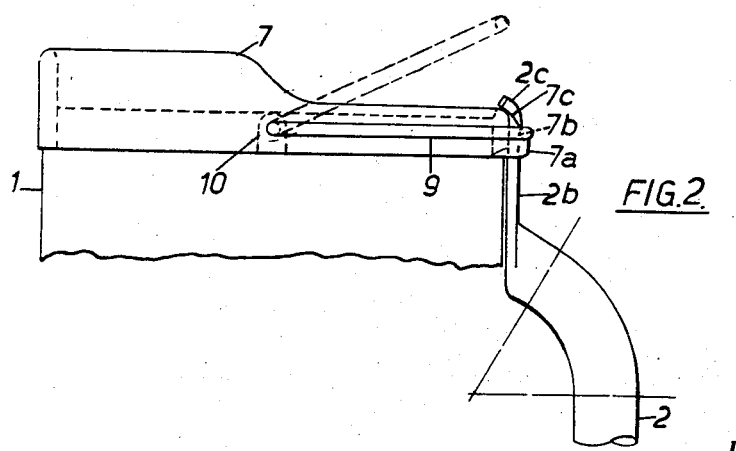
FIG. 2 is a side view to a larger scale of a detail of the carrier shown in FIG. 1.

To mount the bag 1 on the stem 2, the loop is swung back clear of the notches 7b (as shown in broken lines in FIG. 2), the bag 1 is located on the frame by making the tongue-and-socket and pin-and-hole connections with the top and bottom of the frame respectively, and the loop 9 is swung forwards to engage first the top of the lug 2c and finally to pass over the cam face of the lug to engage the top of lugs 7a, to clamp the bag 1 to the stem 2, thereby maintaining said connections. To remove the bag 1 from the stem 2, the loop 9 is swung clear of the tongue 2b and assumes its undeformed configuration, and the bag is simply lifted clear of the stem, the loop 9 then being snapped into a stowed position on the bag.

Figure 6:
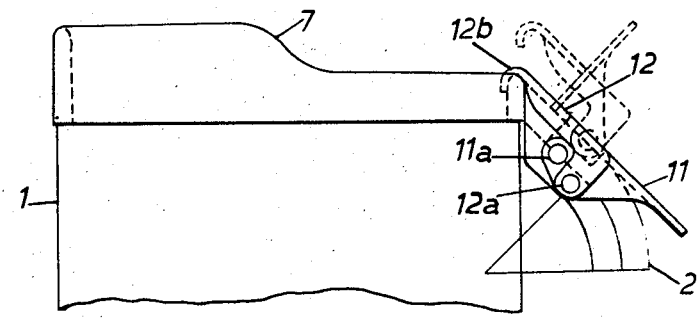
FIG. 6 is a side view corresponding to FIG. 2 but showing an alternative arrangement.

An alternative clamp for detachably coupling the bag's top portion to the stem is shown in FIG. 6 and has a toggle action. For clarity the locating lugs 7a have been omitted from FIG. 6. In this case the stem 2 has a backwardly bent portion at its upper end and said portion has an obliquely cut end abutting the ring 7. A finger lever 11 is pivotally mounted at 11a on the stem 2, and on the lever is pivotally mounted at 12a an arm 12, having thereon a hook formation 12b engageable over the rim of the top ring 7.

The hook 12b and the pivots 11a and 12a are so positioned that when the clamp is in operative position the mechanism locks itself by virtue of the fact that the line of the force transmitted from the hook 12b to the pivot 12a passes behind the pivot 11a, that is, the lever 11 is past its dead-centre position. Raising the lever 11 unlocks the mechanism and disengages the hook 12b from the top ring 7, as shown in dotted outline. The bag is then free for removal from the carrier. To secure the top portion of the bag to the stem, the arm 12 is first pivoted to hook over the rim of the bag. Finally, the configuration of the clamp is changed by pivoting the lever to its operative position past dead centre, whereupon the opposed faces on the ring and stem are forced tightly together to resist movement of the container relative to the support.

Although the aforesaid wheeled frame has a central stem or spine for rigidity, the appended claims are intended to embrace the embodiment of the invention in wheeled frames where no central stem is provided. In such wheeled frames the top and base thereof can have the same connections with the bag as hereinbefore described. The wheeled frame, if foldable, must of course have the bag removed before the frame can be folded.

For convenience, in the following claims the wheeled frame is assumed to be upstanding, for example, as shown in FIG. 1 of the drawings.

I claim:

1. A hand-propelled wheeled carrier having a wheeled stem and an elongated container disposed alongside and detachably mounted on the stem, wherein the container mounting comprises a lateral support on the stem at the bottom thereof and engaged by the base of the container, retaining means including complementary projection and recess means on the base of the container and the support serving to prevent lateral movement of the base of the container from the support co-operating locating means located adjacent the top of the container and the stem including a pair of opposed faces and means for preventing lateral movement including flange means engaging the sides of one of said faces, and a releasable clamp at the container top interconnecting the container top and the stem top to maintain the opposed faces in frictional interengagement so that displacement of the container top is resisted and on release of the clamp lifting of the container from the support is permitted.

2. A hand-propelled wheeled carrier according to claim 1, wherein the support is a lateral platform and the complementary projection and recess means consists of
 (a) the walls of a groove in the container base and the sides of the platform which are received in the groove, and
 (b) a pin-and-hole connection between the floor of the groove and the container base, so that dropping of the container on to the platform effects interlocking of the container base to the platform.

3. A hand-propelled wheeled carrier according to claim 1, wherein the co-operating means adjacent the container top includes an upright tongue on the stem top presenting a side face opposite a side face on the adjacent container, and the clamp consists of a resiliently deformable U-member mounted in the container for pivotal movement between an operative position in which the U-member extends with deformation around the upright tongue to maintain the opposed side faces in frictional interengagement so that displacement of the container top is resisted, and a released position clear of the upright tongue to permit lifting of the container clear of the stem.

4. A hand-propelled wheeled carrier according to claim 3, wherein the lateral movement preventing flange means includes a pair of parallel flanges on the container forming with the container's frictional side face a socket for receiving the upright tongue.

5. A hand-propelled wheeled carrier according to claim 4, wherein the lugs have therein notches which receive the base of the U-member to limit downward pivoting movement of the U-member to an operative position.

6. A hand-propelled wheeled carrier according to claim 5, wherein the retaining means includes a lateral flange attached to the upright tongue and overhanging the adjacent rim of the container.

7. A hand-propelled wheeled carrier according to claim 5, wherein the walls of the notches are formed as cams which maintain the U-member deformed when entered in the notches following detachment of the container, so that the U-member is retained by friction in an operative position in the notches.

8. A hand-propelled wheeled carrier according to claim 3, wherein the clamp includes a U-member of round-section spring material and a tranverse groove in the upright tongue receives the base of the U-member to locate the U-member in operative position.

9. A hand-propelled wheeled carrier according to claim 1, wherein the releasable clamp includes a toggle-operable-hook device mounted on the stem for movement between an operative position engaging the rim of the container and a release position clear of the rim to permit lifting of the container from the support.

10. A hand-propelled wheeled carrier having a wheeled stem and an elongated container disposed alongside and detachably mounted on the stem, wherein the container mounting comprises a lateral supporting tongue on the stem at the bottom thereof and engaged by the base of the container, interlocking formations on the base and support consisting of
 (a) the walls of a slot in the container base and the sides of the tongue which is housed in the slot, and
 (b) a pin-and-hole connection between the floor of the slot and the tongue, so that dropping of the container on to the support effects interlocking of the formations, which serve to prevent slippage of the container from the support while permitting lifting of the container from the support, at the container top co-operating locating formations on the container and stem including an upright tongue on the stem presenting a side face opposite a side face on the adjacent container, and a releasable clamp at the container top interconnecting the container and stem and including a resiliently deformable U-member mounted in the container for pivotal movement between an operative position in which the U-member extends with deformation around the upright tongue to maintain the opposed side faces in frictional interengagement so that displacement of the container top is resisted, and a released position clear of the upright tongue to permit lifting of the container clear of the stem.

References Cited

UNITED STATES PATENTS 2,782,048  2/1957  Williams.
2,854,244  9/1958  Jarman.
3,154,314  10/1964  McCune.
3,265,402  8/1966  Snyder.

LEO FRIAGLIA, Primary Examiner

JOHN A. PEKAR, Assistant Examiner